Patented Oct. 7, 1947

2,428,668

UNITED STATES PATENT OFFICE 2,428,668

SULFURIC ACID OLEFIN ABSORPTION

Henry J. Hibshman, Plainfield, and Insley P. Jones, Basking Ridge, N. J., assignors to Standard Oil Development Company, a corporation of Delaware Application September 15, 1943, Serial No. 502,442

4 Claims. (Cl. 260—677)

This invention relates to improvements in the absorption of olefins and relates particularly to the absorption with sulfuric acid of olefins that tend to polymerize and react with other olefins in the presence of the said acid.

It is known that olefins may be dissolved from a hydrocarbon mixture by contacting with sulfuric acid solutions and that these olefins may be recovered by diluting and heating the acid solution. In the processing of a C4 cut, it is established practice to remove the isobutene first by contacting the hydrocarbon mixture with a sulfuric acid solution of approximately 65% concentration at a temperature of approximately 65° F. The residual hydrocarbons remaining consisting of butane, isobutane and normal butenes are then contacted with sulfuric acid of higher concentration at higher temperatures to remove the normal butenes present. Both of these acid extracts are diluted and heated with steam to recover overhead a gaseous mixture of butenes, polymer, alcohol, ether and water. This vapor mixture is fractionated for the recovery of butenes. When sulfuric acid of 65% concentration is used at the temperature of 65° F., a substantial residue of the isobutene remains in solution in the hydrocarbon mixture unless prolonged periods of time of contact are used, with the result that a substantial quantity of the isobutenes is polymerized.

The object of this invention is to provide a method in which an isobutylene of 100% purity can be recovered.

Another object of the invention is to provide a method in which the corrosion resulting from the use of sulfuric acid of about 65% concentration is avoided.

These and other objects of the invention will be understood upon reading the following description with reference to the accompanying drawing.

Figure 1:
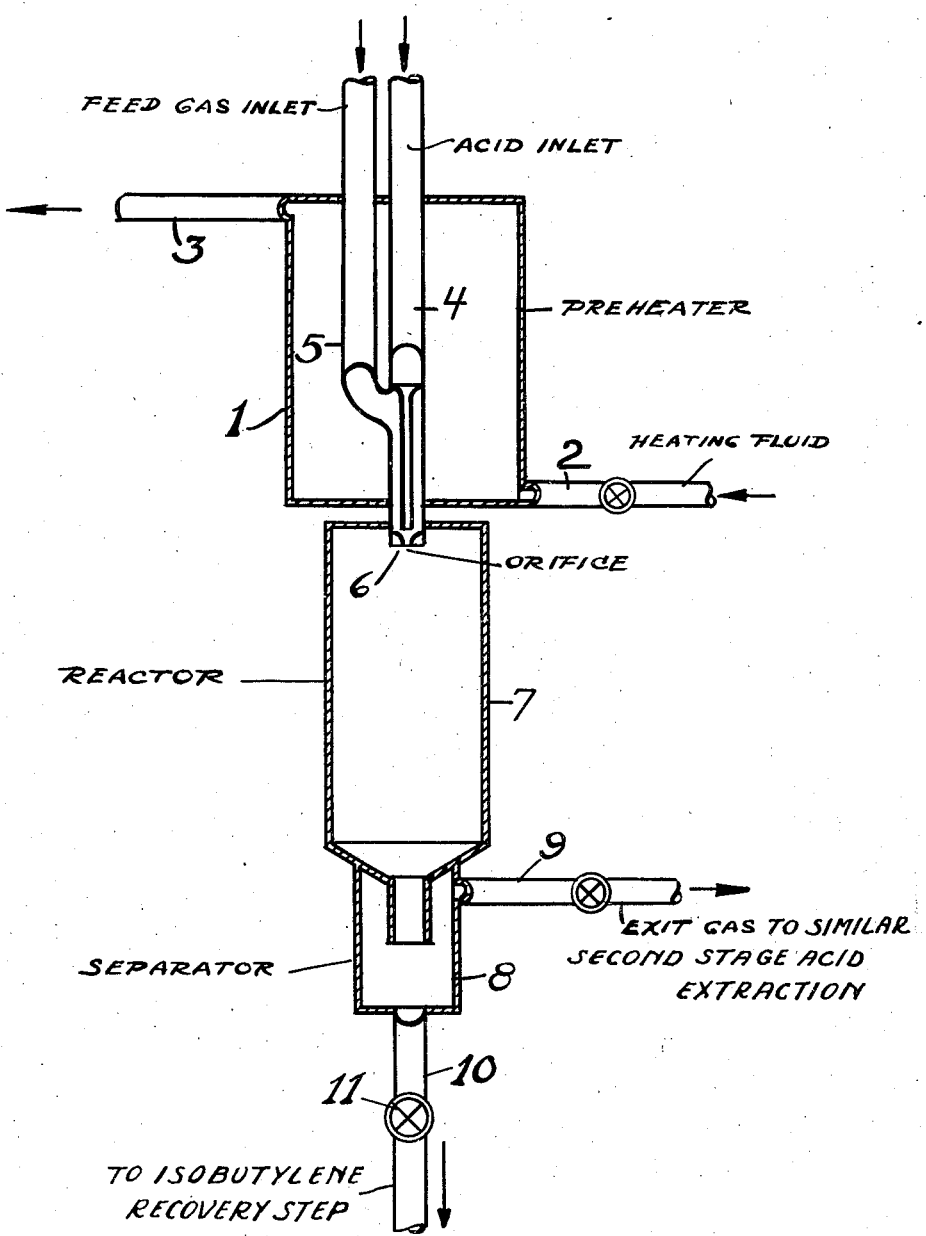

Referring to the drawing in Figure 1, numeral 1 designates a preheater in which the heating fluid is introduced through inlet 2 and withdrawn through outlet 3. In the preheater is set a spray equipment which consists of pipe 4 through which sulfuric acid is passed into a constricted orifice and pipe 5 through which a hydrocarbon gas containing the olefin is introduced. The preheated hydrocarbon gas and sulfuric acid are then forced through orifice 6, the hydrocarbon gas being in the vapor phase as it passes through orifice 6 is mixed with the sulfuric acid and the sulfuric acid is atomized. An atomized mixture of hydrocarbon gas and sulfuric acid gas is passed into reactor 7 which is provided at its lower part with a separator 8 from which the hydrocarbon gas is withdrawn through pipe 9 and the sulfuric acid extract through pipe 10 provided with valve 11.

A series of runs were made at atmospheric pressure with sulfuric acid of 70–98% concentration at 80–200° F. and 0.02 to 14 seconds contact time. Isobutylene removal up to 55% with 100% purity was effected, as illustrated by the following table:

| Operating Conditions | 3 Sec. Contact Time 5 Lbs./sq. in. Orifice Pressure Drop | | | | |
|---|---|---|---|---|---|
| Per Cent Concentration of $H_2SO_4$ | 98 | 90 | 85 | 85 | 70 |
| Per Cent of Isobutylene Removed | 90 | 78 | 55 | 15 | 4 |
| Purity of Isobutylene Recovered | 47 | 62 | 100 | 100 | 100 |

Operating Conditions Using 90% $H_2SO_4$ with a 5 Lbs./sq. in. Orifice Pressure Drop

| | | | |
|---|---|---|---|
| Contact Time, sec | 1 | 2 | 4 |
| Per Cent of Isobutylene Removed | 50 | 68 | 85 |
| Purity of Isobutylene Recovered | 100 | 65 | 50 |

When the temperature of the feed gas and acid was varied from 80 to 200° F., no consistent changes in purity or recovery could be detected. These temperatures, however, refer to the preheater section only and do not necessarily apply to the reaction zone. The actual contact temperatures, therefore, calculated from known heats of absorption are probably more nearly in the range of 300–400° F.

Most of the runs were made at a feed isobutylene/$H_2SO_4$ mol ratio of 1, although the effect of this variable does not appear too critical over the range of 0.5 to 3 studied. The pressure drop across the orifice is important as indicated by the following data obtained with 85% $H_2SO_4$ at 100° F.

| Orifice Pressure Drop, Lbs. per sq. in. | 0.5 | 1 | 5 |
|---|---|---|---|
| Per Cent of Isobutylene Removed | 19 | 47 | 65 |
| Purity of Isobutylene Recovered | 100 | 100 | 99 |

At any acid strength the production of either polymer or extract may be regulated by proper choice of the contact time. The polymer produced from runs in which the isobutylene removal was about 50% (100% purity based on inlet and outlet gas analysis) has a specific gravity of about 0.766 to 0.768 and by A. S. T. M. distillation 70% boils below 390 indicating it to be principally di- and tri-isobutylene.

Figure 2:
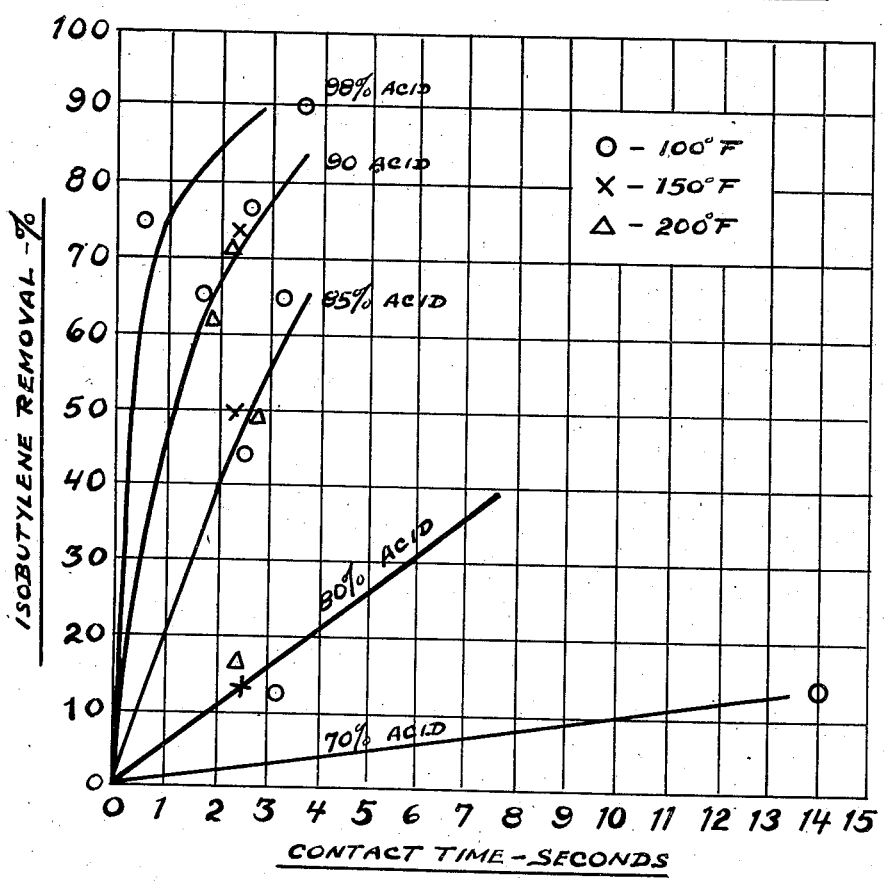

The drawing Figure 2 illustrates the relation between isobutylene removal by means of sulfuric acid and the contact time. That is, sulfuric acids of 80–98% concentration at relatively short periods of contact time may be used to remove substantially the major fraction of isobutylene in a mixture of hydrocarbons containing the said isobutylene. Furthermore, the isobutylene may be removed in step operations as illustrated by the following example:

Example

A C$_4$ cut containing 19.4% isobutylene, 35.1% n-butylenes and 45.5% saturated hydrocarbons was contacted in the vapor phase with 85% H$_2$SO$_4$ (0.8 mole isobutylene/mol H$_2$SO$_4$) by spraying into a reactor (2.2 sec. contact time at 150° F.). 50% of the isobutylene was removed of 100% purity leaving a gas containing 10.4% isobutylene, 50.5% n-butylene and 49.5% saturated hydrocarbons. When this gas was contacted with more 85% H$_2$SO$_4$, 65% of the remaining isobutylene was removed of 73% purity, leaving a gas containing only 2.6% isobutylene and 47.3% n-butylene. The n-butylenes may be removed in a third step where the contact time is increased to 5 to 20 seconds and at least 50% of the n-butylenes are removed in this third step. The per cent removal of n-butylenes may be materially increased by increasing the contact time and/or the concentration of the acid as there is no great tendency of polymer formation.

We claim:

1. In the sulfuric acid absorption of isobutylene, the improvement which comprises heating an isobutylene-containing hydrocarbon gas to a temperature ranging from 80–200° F., heating a sulfuric acid of 85–98% concentration to a temperature ranging from 80–200° F., commingling the hydrocarbon gas and the sulfuric acid in an atomized state for a period of time running from 0.02 to about 3 seconds, immediately separating unreacted hydrocarbon gas from the sulfuric acid and recovering the isobutylene from said acid.

2. In the sulfuric acid absorption of isobutylene, the improvement which comprises heating one mol of isobutylene contained in a mixture of saturated and unsaturated hydrocarbons and one mol of sulfuric acid of 85–98% concentration to a temperature ranging from 80–200° F. and contacting the hydrocarbon in the vapor state and the sulfuric acid in an atomized state for a period of time ranging from 0.2 to 3 seconds, immediately separating the unreacted hydrocarbons from the sulfuric acid, diluting the sulfuric acid with water and heating to recover isobutylene.

3. In the sulfuric acid absorption of isobutylene, the improvement which comprises heating one mol of isobutylene contained in a mixture of saturated and unsaturated hydrocarbons and one mol of sulfuric acid of 85–98% concentration to a temperature ranging from 80–200° F. and contacting the hydrocarbon in the vapor state and the sulfuric acid in an atomized state for a period of time ranging from 0.2 to 3 seconds, immediately separating the unreacted hydrocarbons from the sulfuric acid, diluting the sulfuric acid with water, heating to recover isobutylene, treating the separated hydrocarbons with sulfuric acid of 85–98% concentration, separating the unreacted hydrocarbons from the sulfuric acid, diluting the sulfuric acid extract with water and separating normal butylene.

4. In the sulfuric acid absorption of isobutylene, the improvement which comprises heating an isobutylene-containing hydrocarbon gas at a temperature ranging from 80–200° F., heating sulfuric acid of 85–98% concentration to a temperature of 80–200° F., contacting the hydrocarbon gas with the sulfuric acid in an atomized state for a period of time ranging from 0.2 to 3 seconds, immediately separating the unreacted hydrocarbons from the sulfuric acid, treating the unreacted hydrocarbon gas with another volume of sulfuric acid of 85–98% concentration for a period of time ranging from 0.2 to 3 seconds, separating the unreacted hydrocarbons from the sulfuric acid, diluting the sulfuric acid extract with water and heating to recover isobutylene.

HENRY J. HIBSHMAN.
INSLEY P. JONES.

REFERENCES CITED

The following references are of record in the file of this patent:

UNITED STATES PATENTS

| Number | Name | Date |
|---|---|---|
| 2,281,911 | Bannon et al. | May 5, 1942 |
| 2,012,785 | Deanesley et al. | Aug. 27, 1935 |
| 1,908,923 | Schaeffer et al. | May 16, 1933 |
| 1,575,116 | Jones | Mar. 2, 1926 |

FOREIGN PATENTS

| Number | Country | Date |
|---|---|---|
| 462,558 | Great Britain | Mar. 11, 1937 |
| 482,427 | Great Britain | Mar. 24, 1938 |
| 523,894 | Great Britain | July 25, 1940 |
| 415,766 | Great Britain | Sept. 3, 1934 |
| 377,480 | Great Britain | July 28, 1932 |